United States Patent [19]

Ehlers et al.

[11] 4,222,994

[45] * Sep. 16, 1980

[54] SOLVENT EXTRACTION PURIFICATION OF WET-PROCESSED PHOSPHORIC ACID

[75] Inventors: Klaus-Peter Ehlers, Erftstadt; Wolfgang Scheibitz, Hürth-Knapsack; Klaus Schrödter, Cologne; Gero Heymer, Erftstadt, all of Fed. Rep. of Germany

[73] Assignee: Hoechst Aktiengesellschaft, Fed. Rep. of Germany

[ * ] Notice: The portion of the term of this patent subsequent to Apr. 29, 1997, has been disclaimed.

[21] Appl. No.: 859,681

[22] Filed: Dec. 12, 1977

[30] Foreign Application Priority Data

Dec. 17, 1976 [DE] Fed. Rep. of Germany ....... 2657189

[51] Int. Cl.$^2$ ............................................. C01B 25/16
[52] U.S. Cl. ................................................. 423/321 S
[58] Field of Search ..................................... 423/321 S

[56] References Cited

U.S. PATENT DOCUMENTS

| | | | |
|---|---|---|---|
| 3,684,439 | 8/1972 | Rose et al. | 423/321 S |
| 3,953,581 | 4/1976 | Ehlers et al. | 423/321 S |
| 3,956,465 | 5/1976 | Amanrich | 423/321 S |

FOREIGN PATENT DOCUMENTS 2605106  8/1977  Fed. Rep. of Germany ....... 423/321 S

OTHER PUBLICATIONS

Treybal, Liquid Extraction, 1963, pp. 225–239.

*Primary Examiner*—Brian E. Hearn
*Attorney, Agent, or Firm*—Conolly and Hutz

[57] ABSTRACT

Wet-processed phosphoric acid is purified by countercurrent extraction with the use of an organic solvent, in which water is partially soluble and which is capable of absorbing phosphoric acid, the organic phosphoric acid extract is separated from residual wet-processed phosphoric acid, unabsorbed by the solvent, and phosphoric acid is recovered from the separated organic phosphoric acid extract. More specifically, the wet-processed phosphoric acid is extracted with the use of a solvent containing more than 0 and less than 50% of water, based on the saturation concentration, and a mineral acid in a quantity corresponding to the quantity, in moles, of cation-bound phosphate in the crude acid.

10 Claims, 1 Drawing Figure

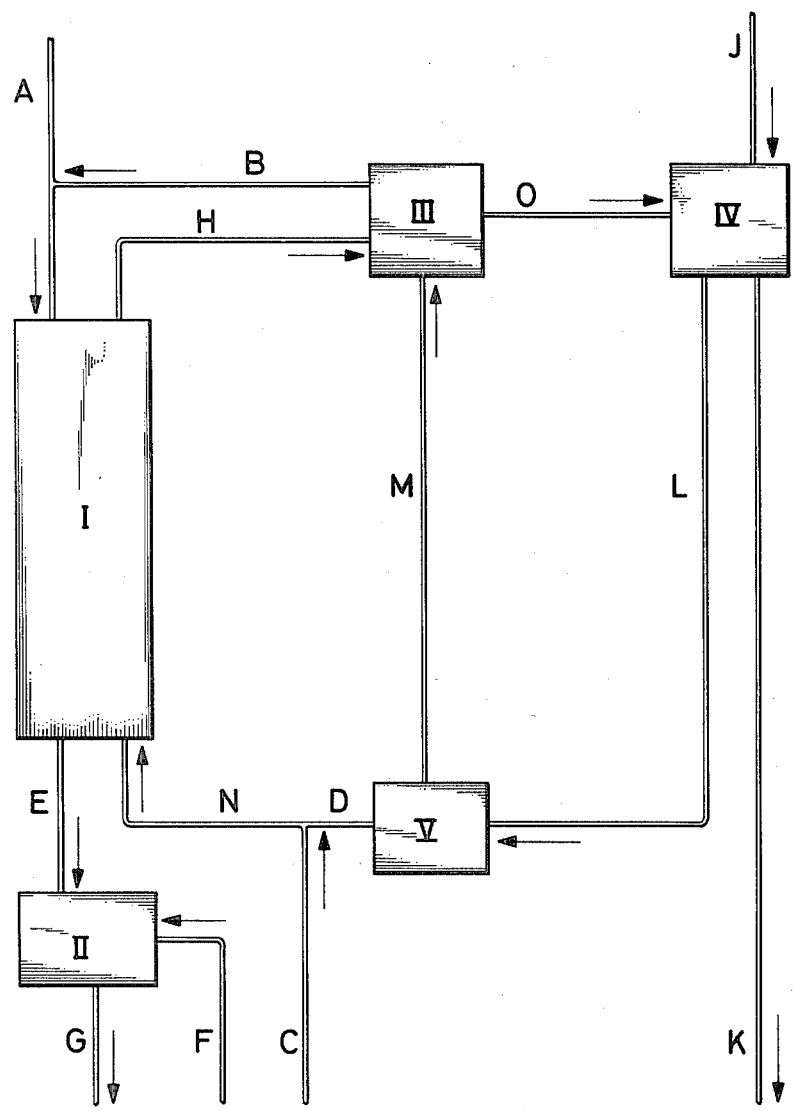

SOLVENT EXTRACTION PURIFICATION OF WET-PROCESSED PHOSPHORIC ACID

This invention relates to a process for purifying wet-processed phosphoric acid by countercurrent extraction with the use of an organic solvent, in which water is partially soluble and which is capable of absorbing phosphoric acid, separation of the organic phosphoric acid extract from residual wet-processed phosphoric acid unabsorbed by the solvent, and recovery of the phosphoric acid from the separated organic phosphoric acid extract.

It has already been described that phosphoric acid can be purified with the use of a solvent which is partially miscible with water and which is used in anhydrous form. In the process described in U.S. Pat. No. 3,956,465, the solvent is employed in a quantity which is necessary to dissolve therein all of the uncombined phosphoric acid and all of the uncombined water in the crude acid. This is, however, not fully satisfactory inasmuch as the residue—also termed raffinate—with the contaminants therein is obtained in the form of viscous or even solid material, depending on the particular crude acid used; this residue is difficult to handle and solvent may be occluded therein.

It has also been suggested that the above solvents should be used in a form in which they contain 40 to 50% less water than they would contain if saturated therewith. This process, which has been disclosed in U.S. Pat. No. 3,956,465 is disadvantageous in respect of the following points: In order to quantitatively extract the phosphoric acid, it is necessary to use the solvent and acid in an increased ratio and to effect the extraction in a plurality of processing stages, substantially in accordance with the law of distribution of a substance between two liquid phases.

The resulting residue with the contaminants therein contains up to more than 60% of water which is disadvantageous as it is normally necessary to free the residue from water, e.g. by concentration, and convert it into material which can readily be disposed of. The residues concerned constitute concentrated solutions of acid salts and these are technically difficult to concentrate.

Further processes have been described, wherein phosphoric acid is recovered from phosphate-containing residues by treatment with a mineral acid and absorption of the resulting phosphoric acid in an organic solvent. These processes are normally combined with the purification of wet-processed phosphoric acid and intended to increase the total yield of $P_2O_5$.

It is therefore an object of the present invention to provide a process for purifying wet-processed phosphoric acid under conditions which ensure:

(a) the absorption of phosphoric acid in the solvent with the use of a minimum acid to solvent ratio and in a minimum of stages;

(b) the recovery of a maximum of purified $P_2O_5$; and (c) the formation of raffinate containing the quantity of water just necessary for uncomplicated manipulation and conversion to material which can be readily disposed of.

We have now unexpectedly found that this object is easy to achieve by our present process, which comprises: extracting the wet-processed phosphoric acid with the use of a solvent containing more than 0 and less than 50%, preferably 15 to 30%, of water than would correspond to the saturation concentration, and a mineral acid in a quantity corresponding to the quantity, in moles, of cation-bound phosphate in the crude acid.

The solvents should more preferably contain 15 to 30% of water, based on the saturation concentration, the preferred organic solvents being those which contain 5 carbon atoms. It is also preferable, after the recovery of the purified phosphoric acid, to circulate the solvent. The mineral acid, which is added to the solvent prior to the extraction step, is preferably an acid other than phosphoric, sulfuric acid being preferred. The solvent should conveniently be used in a quantity which is selected in accordance with the $P_2O_5$-concentration in the impure wet-processed phosphoric acid, i.e. the quantity of solvent is increased with a decreasing $P_2O_5$-concentration. For example, in those cases in which the solvent is a $C_5$-alcohol and in which the crude acid contains 43 to 50 weight% of $P_2O_5$, it is preferable to use 5.5 to 2.5 parts by volume of alcohol per part by volume of acid. The extraction can be effected at temperatures of 0° to 98° C., preferably 20° to 40° C. It is also preferable to effect the extraction in a countercurrent facility comprising 4 to 6 stages, preferably 5 stages. The extraction residue is easy to convert into solid neutral material, which can be readily disposed of, by admixing it with a suitable quantity of quicklime. The warm water-saturated solvent, which is circulated and obtained in known manner by reextracting the organic phosphoric acid extract with the use of an alkali metal hydroxide, is easy to dehydrate to an extent of more than 50% by azeotropic distillation and also by cooling under vacuum.

BRIEF DESCRIPTION OF THE DRAWING

The process of the present invention is more preferably carried out as described hereinafter with reference to the accompanying flow scheme. Impure wet-processed phosphoric acid A is mixed with a scrubbing solution B, coming from a stage III, and the resulting mixture is conveyed to a countercurrent extraction facility I, in which it is extracted with the above solvent N containing water and a mineral acid. The resulting organic phosphoric acid extract is scrubbed in the scrubbing stage III and the scrubbing solution B is recycled and admixed with the impure wet-processed phosphoric acid A. The scrubbed organic phosphoric acid extract O is re-extracted in stage IV and purified phosphoric acid K is recovered therefrom in known manner, either in the form of free acid with the aid of water or in the form of an alkali metal phosphate by treatment with an alkali J. Solvent L which is recovered contains water. In a stage V, the solvent L is freed from water with the exception of a desirable residual water content, the separated water M is recycled to the scrubbing stage III, and the partially dehydrated solvent D is mixed with the mineral acid C to give the mixture N, which is used in the countercurrent extraction facility I for extracting the wet-processed phosphoric acid A. Extract E, which is obtained in this extraction stage, is reacted in a container II with quicklime F and converted to solid, preferably neutral material G, which can be readily disposed of.

The process of this invention offers the following advantages:

(1) In marked contrast with what has long been held in the art, the use of a partially water-miscible solvent containing more than 0 and less than 50% of water, based on the saturation concentration, for extracting wet-processed phosphoric acid does, in fact, not produce solid or unflowable raffinate. By the controlled countercurrent use of a mineral acid in admixture with the solvent, it is more specifically possible in accordance with this invention to convert acid phosphate salts to acid salts of other mineral acids and in this manner to influence the consistency and storability of the raffinate considerably. The raffinates obtained in the present process remain reliably liquid or flowable over a period of at least 4 weeks.

(2) The loss of $P_2O_5$, compared with that which normally accompanies countercurrent extraction methods carried out in the absence of mineral acid, is considerably reduced. Depending on the particular crude phosphoric acid which is processed, the loss of $P_2O_5$, in the production of phosphoric acid from Morocco-phosphate, for example, is reduced from formerly 3 to 7% to 1.5 to 3%, depending on the particular acid, the percentage being based on the total $P_2O_5$-content. In the case of even more seriously contaminated acids made from Florida-phosphate, the loss of $P_2O_5$ is reduced from formerly 15 to 18 to 5 to 7%, based on the total $P_2O_5$-content.

(3) The co-precipitation of mineral acid is effectively prevented by contacting the phosphoric acid countercurrently with the mixture of solvent and mineral acid.

(4) The formation of only one solid waste material in relatively small quantities raises substantially no problems in respect of waste water and enables the present process to be carried out under ecologically beneficial conditions and independently of compound facilities.

(5) The invention enables the extraction to be effected in not more than 4 to 6 stages. The following Examples illustrate the invention which is, however, not limited thereto:

EXAMPLE 1

A commercial grade crude phosphoric acid made from Florida-phosphate, which contained 50.0 weight% of $P_2O_5$ and the following principal contaminants in percent, based on $P_2O_5$, was used:
  Fe: 2.48%;
  Al: 1.60%;
  Mg: 0.56%;
  Ca: 0.13%;
  V: 260 ppm;
  Mn: 760 ppm;
  $SO_4$: 0.15%.

400 kg/h of this crude acid A and 55.5 kg/h of the recycled scrubbing solution B were contacted countercurrently in the five-stage countercurrent unit I with a mixture N of 21.5 kg/h of concentrated sulfuric acid C (96% of $H_2SO_4$) and 1142.7 kg/h of amyl alcohol D, which came from an oxosynthesis and contained 2.0% of $H_2O$ (22.8 kg/h of $H_2O$). 91.8 kg/h of a raffinate E, which contained 10.0 kg/h of $P_2O_5$, was obtained. The final loss, based on the $P_2O_5$-content of the crude acid, was 5.0%. This raffinate E was delivered to an unheated double screw mixer II and reacted therein with 16.5 kg/h of CaO F to give 98.5 kg/h of a solid friable waste product G. Evaporating water was exhausted. At the opposite end of the countercurrent unit I, there were obtained 1527.9 kg/h of a crude extract H, which contained 13.7% of $P_2O_5$. The extract was scrubbed in a multi-stage scrubbing station III and re-extracted in a mono-stage re-extraction zone IV with concentrated sodium hydroxide solution J (50% of NaOH) and 570.5 kg/h of a monosodium phosphate solution K, which contained 33.3 weight% of $P_2O_5$ was obtained. The principal contaminants, which were originally contained in the crude acid, were found in the salt solution in the following residual proportions, in %, based on $P_2O_5$.
  Fe<20 ppm;
  Al<20 ppm;
  Mg<10 ppm;
  Ca<20 ppm;
  V<3 ppm;
  Mn<1 ppm;
  $SO_4$<0.1%.

After it had been re-extracted in the re-extraction stage IV, partially water-saturated amyl alcohol L which was at 78° C. (heat of neutralization) was delivered to a vacuum cooling means V. Without further supply of heat, there were obtained 1142.7 kg/h of amyl alcohol D, which contained 2.0% of water and had a temperature of 32° C. This alcohol was admixed with sulfuric acid and the resulting mixture N was recycled to the extraction stage I, whilst the separated water was recycled at a rate of 42.1 kg/h to the scrubbing stage III for scrubbing the crude extract H.

EXAMPLE 2

A commercial grade crude phosphoric acid made from Morocco-phosphate, which contained 50.3 weight% of $P_2O_5$ and the following principal contaminants in percent, based on $P_2O_5$, was used:
  Fe: 4070 ppm;
  Al: 2200 ppm;
  Mg: 8460 ppm;
  Ca: 2500 ppm;
  V: 460 ppm;
  Mn: 80 ppm;
  $SO_4$: 0.15%.

400 kg/h of this crude acid A and 55.5 kg/h of the recycled scrubbing solution B were contacted countercurrently in the six-stage countercurrent unit I with a mixture N of 8.8 kg/h of concentrated sulfuric acid C (96% of $H_2SO_4$) and 1142.7 kg/h of amyl alcohol D, which came from an oxosynthesis and contained 2.0% of $H_2O$ (22.8 kg/h of $H_2O$). 72 kg/h of a raffinate E, which contained 3.1 kg/h of $P_2O_5$, was obtained. The final loss, based on the $P_2O_5$-content of the crude acid, was 2.0%. This raffinate E was delivered to an unheated double screw mixer II and reacted therein with 10.9 kg/h of quicklime F to give 75 kg/h of a solid friable waste product G. Evaporating water was exhausted. At the opposite end of the countercurrent unit I, there were obtained 1534.5 kg/h of a crude extract H, which contained 14.0% of $P_2O_5$. The extract was scrubbed in a multi-stage scrubbing station III and re-extracted in a multi-stage re-extraction zone IV with water J and 555.4 kg/h of pure phosphoric acid K, which contained 35.5 weight% of $P_2O_5$ was obtained. The principal contaminants, which were originally contained in the crude acid, were found in the purified phosphoric acid in the following residual proportions, in %, based on $P_2O_5$.
  Fe<20 ppm;
  Al<20 ppm;
  Mg<10 ppm;
  Ca<20 ppm;
  V<3 ppm;
  Mn<1 ppm;
  $SO_4$<0.1%.

In the re-extraction stage IV, there was also obtained 1245.33 kg/h of water-saturated amyl alcohol L (10.0%

$H_2O$) which was at room temperature. In a continuous azeotropic distillation stage V, the alcohol was dehydrated with the exception of a residual $H_2O$-content of 2.0%. 1142.7 kg/h of amyl alcohol D with 22.8 kg/h of water, which was dissolved therein, was admixed with concentrated sulfuric acid C and recycled to the extraction unit I. Altogether 102.6 kg/h of distilled water M with a minor proportion of solvent in it was obtained. It was partially recycled to the crude extract scrubbing stage III, and partially discarded, after the solvent had been stripped off.

We claim:

1. In the process for purifying wet-processed phosphoric acid, wherein the phosphoric acid to be decontaminated is extracted countercurrently in an extraction zone with a $C_5$-alcohol; the resulting organic phosphoric acid solution, termed extract, is separated from contaminants unabsorbed by the alcohol, termed raffinate; the decontaminated phosphoric acid is recovered from the alcohol either in the form of free acid by reextracting the organic phosphoric acid solution with water, or in the form of an alkali metal phosphate by reacting the organic phosphoric acid solution with an alkali and the remaining alcohol saturated with water is recycled to the process, the improvement which comprises:
   (a) decontaminating a crude phosphoric acid containing 43 to 50 weight % of $P_2O_5$;
   (b) dehydrating the alcohol being recycled to a water content of 15 to 30% than would correspond to the saturation concentration;
   (c) mixing the alcohol so dehydrated with a mineral acid other than phosphoric acid in a quantity corresponding to the quantity, in moles, of cation-bound phosphate in the crude acid;
   (d) delivering the alcohol-acid mixture obtained to the extraction zone in amounts corresponding to 5.5 to 2.5 parts by volume of acid; and
   (e) using an amount of alcohol which would insure a flowable raffinate.

2. The process as claimed in claim 1, wherein the said mineral acid is sulfuric acid.

3. The process as claimed in claim 1, wherein a concentrated mineral acid is used.

4. The process as claimed in claim 1, wherein the extraction is effected at temperatures of 0° to 98° C.

5. The process as claimed in claim 10, wherein the extraction is effected at temperatures of 20° to 40° C.

6. The process as claimed in claim 1, wherein the extraction is effected in a countercurrent facility comprising 4 to 6 stages.

7. The process as claimed in claim 6, wherein the countercurrent extraction facility comprises 5 stages.

8. The process as claimed in claim 1, wherein the extraction residue is admixed with quicklime and converted into solid neutral waste material.

9. The process as claimed in claim 1, wherein the warm water-saturated alcohol obtained in customary manner by re-extracting the organic phosphoric acid extract with the use of an alkali metal hydroxide, is dehydrated to an extent of more than 50% of the saturation concentration by cooling it under vacuum.

10. The process as claimed in claim 1, wherein:
   (a) the alcohol being recycled is dehydrated by distilling off and condensing a portion of the water contained therein;
   (b) the condensed water obtained is used for scrubbing the extract deriving from the extraction zone, with the resultant formation of a scrubbing solution;
   (c) the said scrubbing solution is mixed with the phosphoric acid to be decontaminated before delivering it to the extraction zone; and
   (d) the raffinate originating from the extraction zone is reacted with quicklime to give a solid residue.

* * * * *